US012748440B2

(12) United States Patent
Bohez et al.

(10) Patent No.: US 12,748,440 B2
(45) Date of Patent: Sep. 29, 2026

(54) CONTROLLING ROBOTS USING LATENT ACTION VECTOR CONDITIONED CONTROLLER NEURAL NETWORKS

(71) Applicant: GDM Holding LLC, Mountain View, CA (US)

(72) Inventors: Steven Bohez, London (GB); Saran Tunyasuvunakool, London (GB)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 18/850,857

(22) PCT Filed: Mar. 27, 2023

(86) PCT No.: PCT/EP2023/057855
§ 371 (c)(1),
(2) Date: Sep. 25, 2024

(87) PCT Pub. No.: WO2023/180585
PCT Pub. Date: Sep. 28, 2023

(65) Prior Publication Data

US 2025/0224737 A1 Jul. 10, 2025

Related U.S. Application Data

(60) Provisional application No. 63/323,992, filed on Mar. 25, 2022.

(51) Int. Cl.
*G05D 1/648* (2024.01)
*G05D 101/15* (2024.01)
(Continued)

(52) U.S. Cl.
CPC ............ *G05D 1/648* (2024.01); *G06N 3/044* (2023.01); *G06N 3/0499* (2023.01); *G06N 3/092* (2023.01);
(Continued)

(58) Field of Classification Search
CPC G06N 3/02; G06N 3/04; G06N 3/044; G06N 3/0499; G06N 3/092; G06N 3/045; G06N 3/047; G06N 3/084; G06V 20/52; G06V 20/56; G05D 1/606; G05D 1/648; G05D 2101/15; G05D 2109/10; G05D 2109/12; B25J 9/16; B25J 9/1679
See application file for complete search history.

(56) References Cited

U.S. PATENT DOCUMENTS

| | | | | |
|---|---|---|---|---|
| 12,585,941 | B2 * | 3/2026 | Anthony | G06N 3/006 |
| 2020/0104685 | A1 * | 4/2020 | Hasenclever | G06N 3/096 |

(Continued)

OTHER PUBLICATIONS

Abdolmaleki et al., A distributional view on multi-objective policy optimization, in Proceedings of the 37th International Conference on Machine Learning (ICML), Nov. 21, 2020, 12 pages.

(Continued)

*Primary Examiner* — Brandon Z Willis
(74) *Attorney, Agent, or Firm* — Fish & Richardson P.C.

(57) ABSTRACT

Methods, systems, and apparatus, including computer programs encoded on a computer storage medium, for controlling agents. In particular, an agent can be controlled using a hierarchical controller that includes a task policy neural network and a low-level controller neural network.

20 Claims, 6 Drawing Sheets

(51) Int. Cl.
*G05D 109/12* (2024.01)
*G06N 3/044* (2023.01)
*G06N 3/0499* (2023.01)
*G06N 3/092* (2023.01)

(52) U.S. Cl.
CPC ..... *G05D 2101/15* (2024.01); *G05D 2109/12* (2024.01)

(56) References Cited

U.S. PATENT DOCUMENTS

2022/0076099 A1 * 3/2022 Sermanet ............. G06N 3/0442
2023/0244906 A1 * 8/2023 Becnel ................... G06N 3/044 706/30

OTHER PUBLICATIONS

Alemi et al.,"Deep variational information bottleneck," CoRR, submitted on Dec. 1, 2016, arXiv:1612.00410v7, 19 pages.
Andrychowicz et al., "Learning dexterous in-hand manipulation," The International Journal of Robotics Research, Jan. 2020, 39(1):3-20.
Apgar et al., "Fast online trajectory optimization for the bipedal robot cassie," In Robotics: Science and Systems, Jun. 26, 2018, p. 14.
Bellicoso et al., "Dynamic locomotion through online nonlinear motion optimization for quadrupedal robots," IEEE Robotics and Automation Letters, Jan. 17, 2018, 3(3):2261-2268.
Bloesch et al., "Towards real robot learning in the wild: a case study in bipedal locomotion," In 5th Annual Conference on Robot Learning, Jan. 11, 2022, p. 1502-1511.
Bohez et al., "Value constrained model-free continuous control," CoRR, submitted on Feb. 12, 2019, arXiv:1902.04623v1, 12 pages.
Brakel et al., "Learning coordinated terrain-adaptive locomotion by imitating a centroidal dynamics planner," CoRR, submitted on Oct. 23, 2022, arXiv:2111.00262v1, 10 pages.
Carius et al., "Trajectory optimization with implicit hard contacts," IEEE Robotics and Automation Letters, Jul. 4, 2018, 3(4):3316-3323.
Chentanez et al., "Physics-based motion capture imitation with deep reinforcement learning," In Proceedings of the 11th annual international conference on motion, interaction, and games, Nov. 8, 2018, p. 1-10.
Galashov et al., "Information asymmetry in KL-regularized RL," CoRR, submitted on May 3, 2019, arXiv:1905.01240v1, 25 pages.
Gangapurwala et al., "Real-time trajectory adaptation for quadrupedal locomotion using deep reinforcement learning," 2021 IEEE International Conference on Robotics and Automation (ICRA), May 30, 2021, p. 5973-5979.
Gleicher, "Retargetting motion to new characters," In Proceedings of the 25th Annual Conference on Computer Graphics and Interactive Techniques, Apr. 27, 1998, 10 pages.
Goyal et al., "Transfer and exploration via the information bottleneck," CoRR, submitted on Jan. 30, 2019, arXiv:1901.10902v5, 20 pages.
Haarnoja et al., "Learning to walk via deep reinforcement learning," CoRR, submitted on Dec. 26, 2018, arXiv:1812.11103v3, 10 pages.
Hafner et al., "Towards general and autonomous learning of core skills: a case study in locomotion," In Conference on Robot Learning, Oct. 4, 2021, p. 1084-1099.
Hasenclever et al.,"Comic: Complementary task learning & mimicry for reusable skills," In International Conference on Machine Learning, Nov. 21, 2020, p. 4105-4115.
Heess et al., "Emergence of locomotion behaviours in rich environments," CoRR, submitted on Jul. 7, 2017, arXiv:1707.02286v2, 14 pages.
Hochreiter et al., "Long Short-Term Memory," Neural Computation, 1997, 9(8):1735-1780.
Holden et al., "Phase-functioned neural networks for character control," ACM Transactions on Graphics (TOG), Jul. 20, 2017, 36(4):1-13.
Hutter et al., "Anymal-a highly mobile and dynamic quadrupedal robot," In 2016 IEEE/RSJ international conference on intelligent robots and systems (IROS), Oct. 9, 2016, p. 38-44.
Hwangbo et al., "Learning agile and dynamic motor skills for legged robots," CoRR, submitted on Jan. 24, 2019, arXiv:1901.08652v1, 20 pages.
International Preliminary Report on Patentability in International Appln. No. PCT/EP2023/057855, mailed on Oct. 10, 2024, 18 pages.
International Search Report and Written Opinion in International Appln. No. PCT/EP2023/057855, mailed on Aug. 11, 2023, 25 pages.
Invitation to Pay Additional Fees in International Appln. No. PCT/EP2023/057855, mailed on Jun. 21, 2023, 18 pages.
Kalakrishnan et al., "Fast, robust quadruped locomotion over challenging terrain," In 2010 IEEE International Conference on Robotics and Automation, May 3, 2010, p. 2665-2670.
Lee et al., "Learning quadrupedal locomotion over challenging terrain," CoRR, submitted on Oct. 21, 2020, arXiv:2010.11251v1, 22 pages.
Li et al., "Reinforcement learning for robust parameterized locomotion control of bipedal robots," CoRR, submitted on Mar. 26, 2021, arXiv:2103.14295v1, 7 pages.
Liu et al., "From motor control to team play in simulated humanoid football," CoRR, submitted on May 25, 2021, arXiv:2105.12196v1, 57 pages.
Merel et al., "Catch & carry: reusable neural controllers for vision-guided whole-body tasks," ACM Transactions on Graphics (TOG), Jul. 8, 2020, 39(4):39-1.
Merel et al., "Learning human behaviors from motion capture by adversarial imitation," CoRR, submitted on Jul. 7, 2017, arXiv:1707.02201v2, 12 pages.
Merel et al., "Neural probabilistic motor primitives for humanoid control," CoRR, submitted on Jan. 15, 2019, arXiv:1811.11711v2, 14 pages.
Miki et al., "Learning robust perceptive locomotion for quadrupedal robots in the wild," Science Robotics, 7(62):eabk2822.
Mocap.cs.cmu.edu [online], "CMU Graphics Lab Motion Capture Database," available on or before Mar. 21, 2003, via Internet Archive: Wayback Machine URL <https://web.archive.org/web/20250000000000*/http://mocap.cs.cmu.edu/>, retrieved on Jan. 9, 2025, 2 pages.
Neunert et al., "Trajectory optimization through contacts and automatic gait discovery for quadrupeds," CoRR, submitted on Jul. 15, 2016, arXiv:1607.04537v1, 11 pages.
Oord et al., "Wavenet: a generative model for raw audio," CoRR, submitted on Sep. 12, 2016, arXiv:1609.03499v2, 15 pages.
Peng et al., "Deepmimic: Example-guided deep reinforcement learning of physics-based character skills," ACM Transactions on Graphics, Jul. 30, 2018, 37(4):1-4.
Peng et al., "Mcp: Learning composable hierarchical control with multiplicative compositional policies," CoRR, submitted on May 23, 2019, arXiv:1905.09808v1, 18 pages.
Peng et al., "Simto-real transfer of robotic control with dynamics randomization," CoRR, submitted on Oct. 18, 2017, arXiv:1710.06537v3, 8 pages.
Peng et al.,"Learning agile robotic locomotion skills by imitating animals," CoRR, submitted on Apr. 2, 2020, arXiv:2004.00784v3, 14 pages.
Peng et al., "Amp: Adversarial motion priors for stylized physics-based character control," ACM Transactions on Graphics (ToG), Jul. 19, 2021, 40(4):1-20.
Perlin et al., "An image synthesizer," In Proceedings of the 12th Annual Conference on Computer Graphics and Interactive Techniques, Jul. 1, 1985, p. 287-296.
Pollard et al., "Adapting human motion for the control of a humanoid robot," In Proceedings 2002 IEEE international conference on robotics and automation, May 11, 2002, 1390-1397.
Robotis.com [online], "Open Platform Humanoid Project," available on or before Feb. 11, 2018, via Internet Archive: Wayback

(56) References Cited

OTHER PUBLICATIONS

Machine URL<https://web.archive.org/web/20250000000000*/https://emanual.robotis.com/docs/en/platform/op3/introduction/>, retrieved on Jan. 9, 2025, 7 pages.

Sadeghi et al., "CAD2RL: Real single-image flight without a single real image," CoRR, submitted on Nov. 13, 2016, arXiv:1611.04201v4, 12 pages.

Safonova et al., "Construction and optimal search of interpolated motion graphs," In ACM SIGGRAPH 2007 papers, Jul. 29, 2007, p. 106-es.

Siekmann et al., "Blind bipedal stair traversal via sim-to-real reinforcement learning," CoRR, submitted on May 18, 2021, arXiv:2105.08328v1, 9 pages.

Song et al., "V-mpo: on-policy maximum a posteriori policy optimization for discrete and continuous control," CoRR, submitted on Sep. 26, 2019, arXiv:1909.12238v1, 19 pages.

Tan et al., "Sim-to-real: Learning agile locomotion for quadruped robots," CoRR, submitted on Apr. 27, 2018, arXiv:1804.10332v2, 11 pages.

Tassa et al., "dm control: Software and tasks for continuous control," Software Impacts, Nov. 1, 2020, 6:100022.

Tirumala et al., "Behavior priors for efficient reinforcement learning," Journal of Machine Learning Research, 2022, 23(221):1-68.

Tishby et al., "The information bottleneck method," CoRR, submitted on Apr. 24, 2000, arXiv:physics/0004057v1, 16 pages.

Tobin et al., "Domain randomization for transferring deep neural networks from simulation to the real world," CoRR, submitted on Mar. 20, 2017, arXiv:1703.06907v1, 8 pages.

Todorov et al., "Mujoco: a physics engine for model-based control," In 2012 IEEE/RSJ International Conference on Intelligent Robots and Systems, p. 5026-5033.

Wang et al., "Robust imitation of diverse behaviors," CoRR, submitted on Jul. 10, 2017, arXiv:1707.02747v2, 12 pages.

Xie et al., "Dynamics randomization revisited: a case study for quadrupedal locomotion," CoRR, submitted on Nov. 4, 2020, arXiv:2011.02404v3, 7 pages.

Xie et al., "Learning locomotion skills for cassie: Iterative design and sim-to-real," In Conference on Robot Learning, May 12, 2020, p. 317-329.

Yang et al., "Multi-expert learning of adaptive legged locomotion," Science Robotics, Dec. 9, 2020, 5(49): eabb2174.

Yu et al., "Sim-to-real transfer for biped locomotion," CoRR, submitted on Mar. 4, 2019, arXiv:1903.01390v2, 8 pages.

Zhang et al., "Mode-adaptive neural networks for quadruped motion control," ACM Transaction on Graphics, Jul. 30, 2018, 37(4):1-4.

Office Action in European Appln. No. 23714736.8, Apr. 1, 2026, 8 pages.

* cited by examiner

CONTROLLING ROBOTS USING LATENT ACTION VECTOR CONDITIONED CONTROLLER NEURAL NETWORKS

CROSS-REFERENCE TO RELATED APPLICATIONS

This application is a National Stage Application under 35 U.S.C. § 371 and claims the benefit of International Application No. PCT/EP2023/057855, filed Mar. 27, 2023, which claims priority to U.S. Provisional Application Ser. No. 63/323,992 filed on Mar. 25, 2022, the disclosure of which is incorporated in its entirety into this application.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations that controls an agent interacting with an environment using a hierarchical controller that includes a task policy neural network and a low-level controller neural network.

Particular embodiments of the subject matter described in this specification can be implemented so as to realize one or more of the following advantages.

The described techniques control an agent by using a low-level, reusable latent-conditioned controller that can map latent action vectors to effective control inputs for an agent. In examples of the techniques described below, the architecture of the controller prevents the controller from simply memorizing latent action sequences during training and instead allows the controller to effectively control a real-world robot even when the controller (and the corresponding task policy neural network) were trained in simulation. Moreover, in the examples the architecture of the controller results in control inputs that are safe to employ in the real-world, i.e., that avoid high torques and jerk that can cause wear and tear on the robot or cause hardware failures and that are commonly present in other simulation-trained systems.

By training this model as described in the examples, the system can use the same controller to learn a diverse set of reusable motor skills for robots based on a reference trajectory set, e.g., that depicts natural human or animal movements or that depicts movements by a hard-wired robot. The learned skills are versatile so that they can be used for a variety of different tasks, e.g., locomotion tasks, and they are robust such that they can be transferred to the real robot while maintaining the desired smooth and natural looking motion styles employed by the other agent.

The approach described with reference to the examples alleviates the need for carefully designed learning objectives or regularization strategies when training task-oriented controllers and constitutes a general strategy for learning useful and functional robot skills.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
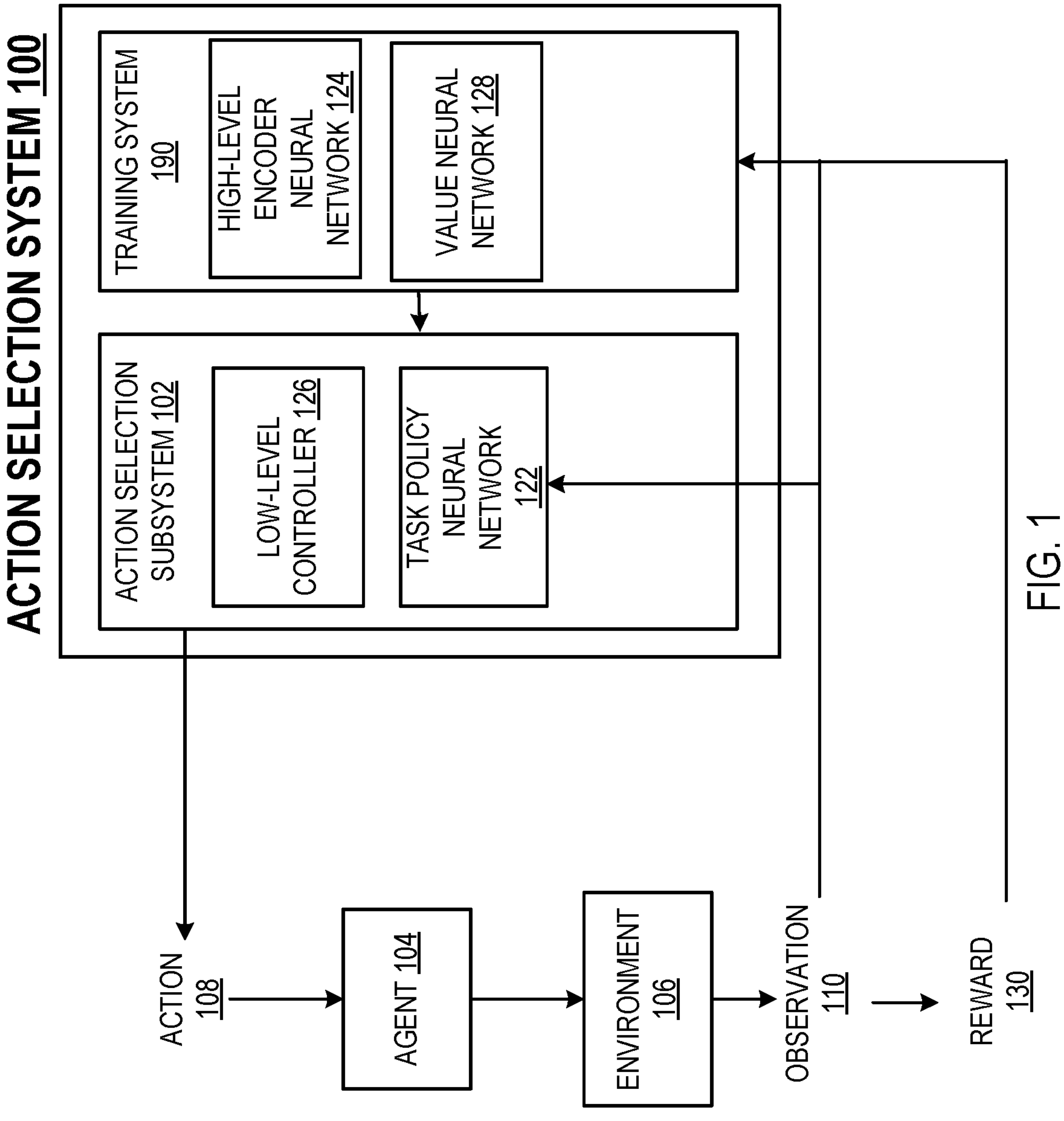
FIG. 1 shows an example action selection system.

FIG. 1 shows an example action selection system 100. The action selection system 100 is an example of a system implemented as computer programs on one or more computers in one or more locations in which the systems, components, and techniques described below are implemented.

The action selection system 100 controls an agent 104 interacting with an environment 106 to accomplish a task by selecting actions 108 to be performed by the agent 104 at each of multiple time steps during the performance of an episode of the task.

As a general example, the task can include one or more of, e.g., navigating to a specified location in the environment, identifying a specific object in the environment, manipulating the specific object in a specified way, controlling items of equipment to satisfy criteria, distributing resources across devices, and so on.

More generally, the task is specified by received rewards, e.g., such that an episodic return is maximized when the task is successfully completed. Rewards and returns will be described in more detail below. Examples of agents, tasks, and environments are also provided below.

An "episode" of a task is a sequence of interactions during which the agent attempts to perform a single instance of the task starting from some starting state of the environment. In other words, each task episode begins with the environment being in an initial state, e.g., a fixed initial state or a randomly selected initial state, and ends when the agent has successfully completed the task or when some termination criterion is satisfied, e.g., the environment enters a state that has been designated as a terminal state or the agent performs a threshold number of actions without successfully completing the task.

At each time step during any given task episode, the system 100 receives an observation 110 characterizing the current state of the environment 106 at the time step and, in response, selects an action 108 to be performed by the agent 104 at the time step. An action to be performed by the agent will also be referred to in this specification as a "control input." After the agent performs the action 108, the environment 106 transitions into a new state and the system 100 receives a reward 130 from the environment 106.

Generally, the reward 130 is a scalar numerical value and characterizes the progress of the agent 104 towards completing the task.

As a particular example, the reward 130 can be a sparse binary reward that is zero unless the task is successfully completed as a result of the action being performed, i.e., is only non-zero, e.g., equal to one, if the task is successfully completed as a result of the action performed.

As another particular example, the reward 130 can be a dense reward that measures a progress of the agent towards completing the task as of individual observations received during the episode of attempting to perform the task, i.e., so that non-zero rewards can be and frequently are received before the task is successfully completed.

While performing any given task episode, the system 100 selects actions in order to attempt to maximize a return that is received over the course of the task episode.

That is, at each time step during the episode, the system 100 selects actions that attempt to maximize the return that will be received for the remainder of the task episode starting from the time step.

Generally, at any given time step, the return that will be received is a combination of the rewards that will be received at time steps that are after the given time step in the episode.

For example, at a time step t, the return can satisfy:

$$\sum_i \gamma^{i-t-1} r_i,$$

where i ranges either over all of the time steps after t in the episode or for some fixed number of time steps after t within the episode, $\gamma$ is a discount factor that is greater than zero and less than or equal to one, and $r_i$ is the reward at time step i.

To control the agent, at each time step in the episode, an action selection subsystem 102 of the system 100 uses a task policy neural network 122 and a low-level controller neural network 126 to select the action 108 that will be performed by the agent 104 at the time step.

In particular, the action selection subsystem 102 uses the task policy neural network 122 and the low-level controller neural network 126 to process the observation 110 to generate a policy output and then uses the policy output to select the action 108 to be performed by the agent 104 at the time step.

In one example, the policy output may include a respective numerical probability value for each action in a fixed set of actions. The system 102 can select the action, e.g., by sampling an action in accordance with the probability values for the action indices, or by selecting the action with the highest probability value.

In another example, the policy output may include a respective Q-value for each action in the fixed set. The system 102 can process the Q-values (e.g., using a soft-max function) to generate a respective probability value for each action, which can be used to select the action (as described earlier), or can select the action with the highest Q-value.

The Q-value for an action is an estimate of a return that would result from the agent performing the action in response to the current observation and thereafter selecting future actions performed by the agent in accordance with current values of the parameters of the task policy neural network 122 and the low-level controller neural network 126.

As another example, when the action space is continuous, the policy output can include parameters of a probability distribution over the continuous action space and the system 102 can select the action by sampling from the probability distribution or by selecting the mean action. A continuous action space is one that contains an uncountable number of actions, i.e., where each action is represented as a vector having one or more dimensions and, for each dimension, the action vector can take any value that is within the range for the dimension and the only constraint is the precision of the numerical format used by the system 100.

As yet another example, when the action space is continuous the policy output can include a regressed action, i.e., a regressed vector representing an action from the continuous space, and the system 102 can select the regressed action as the action 108.

Controlling the agent at any given time step using the task policy neural network 122 and the low-level controller neural network 126 will be described in more detail below with reference to FIGS. 2 and 3.

Prior to using the task policy neural network 122 and the low-level controller neural network 126 to control the agent, a training system 190 within the system 100 or another training system can train the task policy neural network 122 and the low-level controller neural network 126.

In particular, the training system 190 can first jointly train an original high-level encoder neural network 124 and an original low-level controller through imitation learning, e.g., on offline data representing a plurality of sequences of tuples (observations (e.g. sensor data or data derived from sensor data) and corresponding actions), where each sequence is derived from a corresponding set of interactions in which a corresponding expert agent (e.g. a human agent) interacted with an environment. Note that the expert may be the same for all the sequences or may be different for different sequences. An "expert agent" can be any appropriate agent that is able to effectively interact with the environment, e.g., an animal, a human, an agent controlled by an already-trained policy, an agent controlled by a hard-coded policy, and so on. In imitation learning the original high-level encoder neural network 124 and the original low-level controller may be jointly trained (that is, with gradients from the high-level encoder neural network being backpropagated into the low-level controller) using a loss function including at least one imitation learning term, which characterizes, according to a corresponding similarity criterion, the similarity between actions of the agent controlled based on the output of the original low-level controller and the actions specified in the corresponding tuple. The presence of the imitation learning term means that the joint training increases the probability that when context information of one of the tuples is input to the high-level encoder neural network 124, and data from the observation in the tuple and the output of the high-level encoder neural network 124 are input to the original low-level controller, the output of the original low-level controller identifies the action of the tuple.

The offline data may be derived from real-world data (observations of the real-world comprising sensor data captured by sensors and actions performed in the real world). However, in an example discussed below, the observations of the offline data may not be raw real-world sensor data, but may be generated from real-world data, such that generating the offline data comprises transforming ("refactoring") sensor data captured during the trajectories such that the offline data describes episodes (sequences of tuples of observations and corresponding actions) within a simulated environment (e.g. one with fewer degrees of freedom than the real-world environment).

The system 190 can then replace the original high-level encoder neural network 124 with the task policy neural network 122 while keeping the original low-level controller frozen, i.e., so that the low-level controller 126 is the same as the original low-level controller. The system 190 can then train the task policy neural network 122 through reinforcement learning on the rewards 130 for the task, e.g. using tuples of observations, actions, and rewards associated with taking the actions when the state is according to the observations. Updates to the task policy neural network 122 may be such as to increase the likelihood that when the action selection subsystem 102 processes an observation it selects an action statistically associated with a high reward or a high return.

In some implementations, the system 190 also trains a value neural network 128 jointly with the task policy neural network 122. That is, while training through reinforcement learning, the system 190 trains the value neural network 128 and the task policy neural network 122 while keeping the low-level controller 126 frozen.

The value neural network 128 is a neural network that, at any given time step, is configured to receive a value input characterizing the state of the environment at the time step (the "input state") and process the value input to generate a value output that estimates a value of the input state of the environment to performing the task. The "value" of an input state is the return that will be achieved starting from the input state given that actions are selected using the task policy neural network 122 and the low-level controller 126 starting from the input state.

In these implementations, the training system 190 can perform the training using an actor-critic reinforcement learning technique, e.g., Maximum a Posteriori Policy Optimization (MPO) or another appropriate technique.

In some implementations, the value neural network 128 can be provided, as part of the value input, privileged information, i.e., additional information characterizing the input that is not provided to the task policy neural network or the low-level controller neural network. In particular, because the value neural network 128 is only used during training, the value neural network 128 can be provided with information about the environment that is only available during training and will not be available at inference. Thus, by decoupling the value neural network 128 from the task policy neural network 122 and the low-level controller 126, i.e., so that the value neural network is not implemented as a "head" that shares parameters with the neural networks 122 and 126, the system 190 can provide the value neural network 128 with privileged information, which allows the value neural network 128 to generate more accurate value estimates and, therefore, provide a more accurate training signal for the training of the task policy neural network 128.

Providing the value neural network 128 with privileged information will be described in more detail below.

Keeping a neural network "frozen" during training refers to not changing the values of the parameters of the neural network, i.e., keeping the parameter values fixed while changing the parameter values of another neural network.

Training is described in more detail below with reference to FIG. 3-5.

In some implementations, the environment is a real-world environment, the agent is a mechanical agent interacting with the real-world environment, e.g., a robot or an autonomous or semi-autonomous land, air, or sea vehicle operating in or navigating through the environment, and the actions are actions taken by the mechanical agent in the real-world environment to perform the task. For example, the agent may be a robot interacting with the environment to accomplish a specific task, e.g., to locate an object of interest in the environment or to move an object of interest to a specified location in the environment or to navigate to a specified destination in the environment.

In these implementations, the observations may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control signals to control the robot or other mechanical agent, e.g., torques for the joints of the robot or higher-level control commands, or the autonomous or semi-autonomous land, air, sea vehicle, e.g., torques to the control surface or other control elements e.g. steering control elements of the vehicle, or higher-level control commands. The control signals can include for example, position, velocity, or force/torque/acceleration data for one or more joints of a robot or parts of another mechanical agent. The control signals may also or instead include electronic control data such as motor control data, or more generally data for controlling one or more electronic devices within the environment the control of which has an effect on the observed state of the environment. For example in the case of an autonomous or semi-autonomous land or air or sea vehicle the control signals may define actions to control navigation e.g. steering, and movement e.g., braking and/or acceleration of the vehicle.

In some implementations the environment is a simulation of the above-described real-world environment, and the agent is implemented as one or more computers interacting with the simulated environment. For example the simulated environment may be a simulation of a robot or vehicle and the reinforcement learning system may be trained on the simulation and then, once trained, used in the real-world.

In some implementations the environment is a real-world manufacturing environment for manufacturing a product, such as a chemical, biological, or mechanical product, or a food product. As used herein a "manufacturing" a product also includes refining a starting material to create a product, or treating a starting material e.g. to remove pollutants, to generate a cleaned or recycled product. The manufacturing environment may comprise a plurality of manufacturing units such as vessels for chemical or biological substances, or machines, e.g. robots, for processing solid or other materials. The manufacturing units are configured such that an intermediate version or component of the product is moveable between the manufacturing units during manufacture of the product, e.g. via pipes or mechanical conveyance. As used herein manufacture of a product also includes manufacture of a food product by a kitchen robot.

The agent may comprise an electronic agent configured to control a manufacturing unit, or a machine such as a robot, that operates to manufacture the product. That is, the agent may comprise a control system configured to control the manufacture of the chemical, biological, or mechanical product. For example the control system may be configured to control one or more of the manufacturing units or machines or to control movement of an intermediate version or component of the product between the manufacturing units or machines.

As one example, a task performed by the agent may comprise a task to manufacture the product or an intermediate version or component thereof. As another example, a task performed by the agent may comprise a task to control, e.g. minimize, use of a resource such as a task to control electrical power consumption, or water consumption, or the consumption of any material or consumable used in the manufacturing process.

The actions may comprise control actions to control the use of a machine or a manufacturing unit for processing a solid or liquid material to manufacture the product, or an intermediate or component thereof, or to control movement of an intermediate version or component of the product within the manufacturing environment e.g. between the manufacturing units or machines. In general the actions may be any actions that have an effect on the observed state of the environment, e.g. actions configured to adjust any of the sensed parameters described below. These may include actions to adjust the physical or chemical conditions of a manufacturing unit, or actions to control the movement of mechanical parts of a machine or joints of a robot. The actions may include actions imposing operating conditions on a manufacturing unit or machine, or actions that result in changes to settings to adjust, control, or switch on or off the operation of a manufacturing unit or machine.

The rewards or return may relate to a metric of performance of the task. For example in the case of a task that is to manufacture a product the metric may comprise a metric of a quantity of the product that is manufactured, a quality of the product, a speed of production of the product, or to a physical cost of performing the manufacturing task, e.g. a metric of a quantity of energy, materials, or other resources, used to perform the task. In the case of a task that is to control use of a resource the metric may comprise any metric of usage of the resource.

In general observations of a state of the environment may comprise any electronic signals representing the functioning of electronic and/or mechanical items of equipment. For example a representation of the state of the environment may be derived from observations made by sensors sensing a state of the manufacturing environment, e.g. sensors sensing a state or configuration of the manufacturing units or machines, or sensors sensing movement of material between the manufacturing units or machines. As some examples such sensors may be configured to sense mechanical movement or force, pressure, temperature; electrical conditions such as current, voltage, frequency, impedance; quantity, level, flow/movement rate or flow/movement path of one or more materials; physical or chemical conditions e.g. a physical state, shape or configuration or a chemical state such as pH; configurations of the units or machines such as the mechanical configuration of a unit or machine, or valve configurations; image or video sensors to capture image or video observations of the manufacturing units or of the machines or movement; or any other appropriate type of sensor. In the case of a machine such as a robot the observations from the sensors may include observations of position, linear or angular velocity, force, torque or acceleration, or pose of one or more parts of the machine, e.g. data characterizing the current state of the machine or robot or of an item held or processed by the machine or robot. The observations may also include, for example, sensed electronic signals such as motor current or a temperature signal, or image or video data for example from a camera or a LIDAR sensor. Sensors such as these may be part of or located separately from the agent in the environment.

In some implementations the environment is the real-world environment of a service facility comprising a plurality of items of electronic equipment, such as a server farm or data center, for example a telecommunications data center, or a computer data center for storing or processing data, or any service facility. The service facility may also include ancillary control equipment that controls an operating environment of the items of equipment, for example environmental control equipment such as temperature control e.g. cooling equipment, or air flow control or air conditioning equipment, such as a heater, a cooler, a humidifier, or other hardware that modifies a property of air in the real-world environment. The task may comprise a task to control, e.g. minimize, use of a resource, such as a task to control electrical power consumption, or water consumption. The agent may comprise an electronic agent configured to control operation of the items of equipment, or to control operation of the ancillary, e.g. environmental, control equipment.

In general the actions may be any actions that have an effect on the observed state of the environment, e.g. actions configured to adjust any of the sensed parameters described below. These may include actions to control, or to impose operating conditions on, the items of equipment or the ancillary control equipment, e.g. actions that result in changes to settings to adjust, control, or switch on or off the operation of an item of equipment or an item of ancillary control equipment.

In general observations of a state of the environment may comprise any electronic signals representing the functioning of the facility or of equipment in the facility. For example a representation of the state of the environment may be derived from observations made by any sensors sensing a state of a physical environment of the facility or observations made by any sensors sensing a state of one or more of items of equipment or one or more items of ancillary control equipment. These include sensors configured to sense electrical conditions such as current, voltage, power or energy; a temperature of the facility; fluid flow, temperature or pressure within the facility or within a cooling system of the facility; or a physical facility configuration such as whether or not a vent is open.

The rewards or return may relate to a metric of performance of the task. For example in the case of a task to control, e.g. minimize, use of a resource, such as a task to control use of electrical power or water, the metric may comprise any metric of use of the resource.

In some implementations the environment is the real-world environment of a power generation facility e.g. a renewable power generation facility such as a solar farm or wind farm. The task may comprise a control task to control power generated by the facility, e.g. to control the delivery of electrical power to a power distribution grid, e.g. to meet demand or to reduce the risk of a mismatch between elements of the grid, or to maximize power generated by the facility. The agent may comprise an electronic agent configured to control the generation of electrical power by the facility or the coupling of generated electrical power into the grid. The actions may comprise actions to control an electrical or mechanical configuration of an electrical power generator such as the electrical or mechanical configuration of one or more renewable power generating elements e.g. to control a configuration of a wind turbine or of a solar panel or panels or mirror, or the electrical or mechanical configuration of a rotating electrical power generation machine. Mechanical control actions may, for example, comprise actions that control the conversion of an energy input to an electrical energy output, e.g. an efficiency of the conversion or a degree of coupling of the energy input to the electrical energy output. Electrical control actions may, for example, comprise actions that control one or more of a voltage, current, frequency or phase of electrical power generated.

The rewards or return may relate to a metric of performance of the task. For example in the case of a task to control the delivery of electrical power to the power distribution grid the metric may relate to a measure of power transferred, or to a measure of an electrical mismatch between the power generation facility and the grid such as a voltage, current, frequency or phase mismatch, or to a measure of electrical power or energy loss in the power generation facility. In the case of a task to maximize the delivery of electrical power to the power distribution grid the metric may relate to a measure of electrical power or energy transferred to the grid, or to a measure of electrical power or energy loss in the power generation facility.

In general observations of a state of the environment may comprise any electronic signals representing the electrical or mechanical functioning of power generation equipment in the power generation facility. For example a representation of the state of the environment may be derived from observations made by any sensors sensing a physical or electrical state of equipment in the power generation facility that is generating electrical power, or the physical environment of such equipment, or a condition of ancillary equipment supporting power generation equipment. Such sensors may include sensors configured to sense electrical conditions of the equipment such as current, voltage, power or energy; temperature or cooling of the physical environment; fluid flow; or a physical configuration of the equipment; and observations of an electrical condition of the grid e.g. from local or remote sensors. Observations of a state of the environment may also comprise one or more predictions regarding future conditions of operation of the power generation equipment such as predictions of future wind levels or solar irradiance or predictions of a future electrical condition of the grid.

As another example, the environment may be a chemical synthesis or protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may comprise direct or indirect observations of a state of the protein or chemical/intermediates/precursors and/or may be derived from simulation.

In a similar way the environment may be a drug design environment such that each state is a respective state of a potential pharmaceutically active compound, e.g., a pharmaceutical drug, and the agent is a computer system for determining elements of the pharmaceutically active compound and/or a synthetic pathway for the pharmaceutically active compound. The drug/synthesis may be designed based on a reward derived from a target for the drug, for example in simulation. As another example, the agent may be a mechanical agent that performs or controls synthesis of the drug.

In some further applications, the environment is a real-world environment and the agent manages distribution of tasks across computing resources e.g. on a mobile device and/or in a data center. In these implementations, the actions may include assigning tasks to particular computing resources.

As further example, the actions may include presenting advertisements, the observations may include advertisement impressions or a click-through count or rate, and the reward may characterize previous selections of items or content taken by one or more users.

In some cases, the observations may include textual or spoken instructions provided to the agent by a third-party (e.g., an operator of the agent). For example, the agent may be an autonomous vehicle, and a user of the autonomous vehicle may provide textual or spoken instructions to the agent (e.g., to navigate to a particular location).

As another example the environment may be an electrical, mechanical or electro-mechanical design environment, e.g. an environment in which the design of an electrical, mechanical or electro-mechanical entity is simulated. The simulated environment may be a simulation of a real-world environment in which the entity is intended to work. The task may be to design the entity. The observations may comprise observations that characterize the entity, i.e. observations of a mechanical shape or of an electrical, mechanical, or electro-mechanical configuration of the entity, or observations of parameters or properties of the entity. The actions may comprise actions that modify the entity e.g. that modify one or more of the observations. The rewards or return may comprise one or more metric of performance of the design of the entity. For example rewards or return may relate to one or more physical characteristics of the entity such as weight or strength or to one or more electrical characteristics of the entity such as a measure of efficiency at performing a particular function for which the entity is designed. The design process may include outputting the design for manufacture, e.g. in the form of computer executable instructions for manufacturing the entity. The process may include making the entity according to the design. Thus a design of an entity may be optimized, e.g. by reinforcement learning, and then the optimized design output for manufacturing the entity, e.g. as computer executable instructions; an entity with the optimized design may then be manufactured.

As previously described the environment may be a simulated environment. Generally in the case of a simulated environment the observations may include simulated versions of one or more of the previously described observations or types of observations and the actions may include simulated versions of one or more of the previously described actions or types of actions. For example the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle. Generally the agent may be implemented as one or more computers interacting with the simulated environment.

The simulated environment may be a simulation of a particular real-world environment and agent. For example, the system may be used to select actions in the simulated environment during training or evaluation of the system and, after training, or evaluation, or both, are complete, may be deployed for controlling a real-world agent in the particular real-world environment that was the subject of the simulation. This can avoid unnecessary wear and tear on and damage to the real-world environment or real-world agent and can allow the control neural network to be trained and evaluated on situations that occur rarely or are difficult or unsafe to re-create in the real-world environment. For example the system may be partly trained using a simulation of a mechanical agent in a simulation of a particular real-world environment, and afterwards deployed to control the real mechanical agent in the particular real-world environment. Thus in such cases the observations of the simulated environment relate to the real-world environment, and the selected actions in the simulated environment relate to actions to be performed by the mechanical agent in the real-world environment.

In some implementations the agent may not include a human being (e.g. it is a robot). Conversely, in some implementations the agent comprises a human user of a digital assistant such as a smart speaker, smart display, or other device. Then the information defining the task can be obtained from the digital assistant, and the digital assistant can be used to instruct the user based on the task.

For example, the reinforcement learning system may output to the human user, via the digital assistant, instructions for actions for the user to perform at each of a plurality of time steps. The instructions may for example be generated in the form of natural language (transmitted as sound and/or text on a screen) based on actions chosen by the reinforcement learning system. The reinforcement learning system chooses the actions such that they contribute to performing a task. A monitoring system (e.g. a video camera system) may be provided for monitoring the action (if any) which the user actually performs at each time step, in case (e.g. due to human error) it is different from the action which the reinforcement learning system instructed the user to perform. Using the monitoring system the reinforcement learning system can determine whether the task has been completed. During an on-policy training phase and/or another phase in which the history database is being generated, the experience tuples may record the action which the user actually performed based on the instruction, rather than the one which the reinforcement learning system instructed the user to perform. The reward value of each experience tuple may be generated, for example, by comparing the action the user took with a corpus of data showing a human expert performing the task, e.g. using techniques known from imitation learning. Note that if the user performs actions incorrectly (i.e. performs a different action from the one the reinforcement learning system instructs the user to perform) this adds one more source of noise to sources of noise which may already exist in the environment. During the training process the reinforcement learning system may identify actions which the user performs incorrectly with more than a certain probability. If so, when the reinforcement learning system instructs the user to perform such an identified action, the reinforcement learning system may warn the user to be careful. Alternatively or additionally, the reinforcement learning system may learn not to instruct the user to perform the identified actions, i.e. ones which the user is likely to perform incorrectly.

More generally, the digital assistant instructing the user may comprise receiving, at the digital assistant, a request from the user for assistance and determining, in response to the request, a series of tasks for the user to perform, e.g. steps or sub-tasks of an overall task. Then for one or more tasks of the series of tasks, e.g. for each task, e.g. until a final task of the series the digital assistant can be used to output to the user an indication of the task, e.g. step or sub-task, to be performed. This may be done using natural language, e.g. on a display and/or using a speech synthesis subsystem of the digital assistant. Visual, e.g. video, and/or audio observations of the user performing the task may be captured, e.g. using the digital assistant. A system as described above may then be used to determine whether the user has successfully achieved the task e.g. step or sub-task, i.e. from the answer as previously described. If there are further tasks to be completed the digital assistant may then, in response, progress to the next task (if any) of the series of tasks, e.g. by outputting an indication of the next task to be performed. In this way the user may be led step-by-step through a series of tasks to perform an overall task. During the training of the neural network, training rewards may be generated e.g. from video data representing examples of the overall task (if corpuses of such data are available) or from a simulation of the overall task.

As an illustrative example a user may be interacting with a digital assistant and ask for help performing an overall task consisting of multiple steps, e.g. cooking a pasta dish. While the user performs the task, the digital assistant receives audio and/or video inputs representative of the user's progress on the task, e.g. images or video or sound clips of the user cooking. The digital assistant uses a system as described above, in particular by providing it with the captured audio and/or video and a question that asks whether the user has completed a particular step, e.g. 'Has the user finished chopping the peppers?', to determine whether the user has successfully completed the step. If the answer confirms that the use has successfully completed the step then the digital assistant progresses to telling the user to perform the next step or, if at the end of the task, or if the overall task is a single-step task, then the digital assistant may indicate this to the user. The digital assistant may then stop receiving or processing audio and/or video inputs to ensure privacy and/or reduce power use.

In a further aspect there is provided a digital assistant device including a system as described above. The digital assistant can also include a user interface to enable a user to request assistance and to output information. In implementations this is a natural language user interface and may comprise a keyboard, voice input-output subsystem, and/or a display. The digital assistant can further include an assistance subsystem configured to determine, in response to the request, a series of tasks for the user to perform. In implementations this may comprise a generative (large) language model, in particular for dialog, e.g. a conversation agent such as LaMDA, Sparrow, or Chinchilla. The digital assistant can have an observation capture subsystem to capture visual and/or audio observations of the user performing a task; and an interface for the above-described language model neural network (which may be implemented locally or remotely). The digital assistant can also have an assistance control subsystem configured to assist the user. The assistance control subsystem can be configured to perform the steps described above, for one or more tasks e.g. of a series of tasks, e.g. until a final task of the series. More particularly the assistance control subsystem and output to the user an indication of the task to be performed, capture, using the observation capture subsystem, visual or audio observations of the user performing the task, determine from the above-described answer whether the user has successfully achieved the task. In response the digital assistant can progress to a next task of the series of tasks and/or control the digital assistant, e.g. to stop capturing observations.

In the implementations above, the environment may not include a human being or animal. In other implementations, however, it may comprise a human being or animal. For example, the agent may be an autonomous vehicle in an environment which is a location (e.g. a geographical location) where there are human beings (e.g. pedestrians or drivers/passengers of other vehicles) and/or animals, and the autonomous vehicle itself may optionally contain human beings. The environment may also be at least one room (e.g. in a habitation) containing one or more people. The human being or animal may be an element of the environment which is involved in the task, e.g. modified by the task (indeed, the environment may substantially consist of the human being or animal). For example the environment may be a medical or veterinary environment containing at least one human or animal subject, and the task may relate to performing a medical (e.g. surgical) procedure on the subject. In a further implementation, the environment may comprise a human user who interacts with an agent which is in the form of an item of user equipment, e.g. a digital assistant. The item of user equipment provides a user interface between the user and a computer system (the same computer system(s) which implement the reinforcement learning system, or a different computer system). The user interface may allow the user to enter data into and/or receive data from the computer system, and the agent is controlled by the action selection policy to perform an information transfer task in relation to the user, such as providing information about a topic to the user and/or allowing the user to specify a component of a task which the computer system is to perform. For example, the information transfer task may be to teach the user a skill, such as how to speak a language or how to navigate around a geographical location; or the task may be to allow the user to define a three-dimensional shape to the computer system, e.g. so that the computer system can control an additive manufacturing (3D printing) system to produce an object having the shape. Actions may comprise outputting information to the user (e.g. in a certain format, at a certain rate, etc.) and/or configuring the interface to receive input from the user. For example, an action may comprise setting a problem for a user to perform relating to the skill (e.g. asking the user to choose between multiple options for correct usage of the language, or asking the user to speak a passage of the language out loud), and/or receiving input from the user (e.g. registering selection of one of the options, or using a microphone to record the spoken passage of the language). Rewards may be generated based upon a measure of how well the task is performed. For example, this may be done by measuring how well the user learns the topic, e.g. performs instances of the skill (e.g. as measured by an automatic skill evaluation unit of the computer system). In this way, a personalized teaching system may be provided, tailored to the aptitudes and current knowledge of the user. In another example, when the information transfer task is to specify a component of a task which the computer system is to perform, the action may comprise presenting a (visual, haptic or audio) user interface to the user which permits the user to specify an element of the component of the task, and receiving user input using the user interface. The rewards may be generated based on a measure of how well and/or easily the user can specify the component of the task for the computer system to perform, e.g. how fully or well the three-dimensional object is specified. This may be determined automatically, or a reward may be specified by the user, e.g. a subjective measure of the user experience. In this way, a personalized system may be provided for the user to control the computer system, again tailored to the aptitudes and current knowledge of the user.

Optionally, in any of the above implementations, the observation at any given time step may include data from a previous time step that may be beneficial in characterizing the environment, e.g., the action performed at the previous time step, the reward received at the previous time step, or both.

Figure 2:
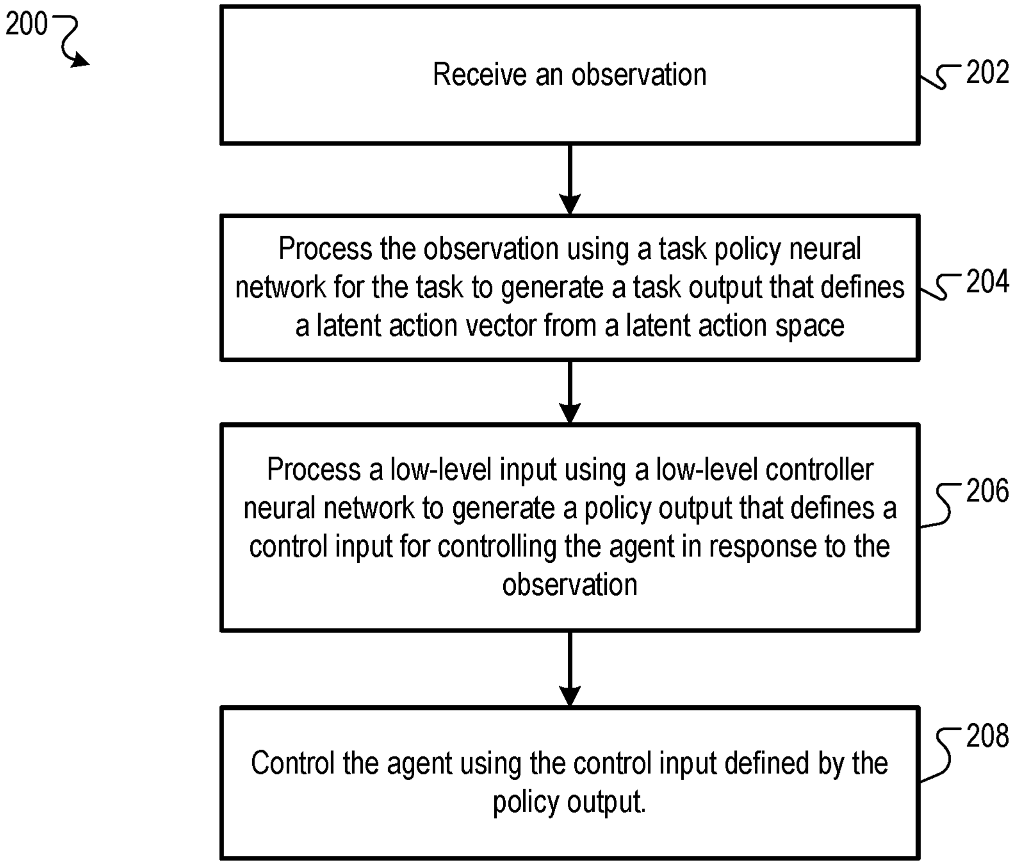
FIG. 2 is a flow diagram of an example process for selecting a control input.

FIG. 2 is a flow diagram of an example process 200 for selecting a control input for the agent. For convenience, the process 200 will be described as being performed by a system of one or more computers located in one or more locations. For example, an action selection system, e.g., the action selection system 100 of FIG. 1, appropriately programmed in accordance with this specification, can perform the process 200.

The system can perform the process 200 at each time step during a sequence of time steps, e.g., at each time step during a task episode. The system continues performing the process 200 until termination criteria for the episode are satisfied, e.g., until the task has been successfully performed, until the environment reaches a designated termination state, or until a maximum number of time steps have elapsed during the episode.

The system receives an observation that includes data characterizing a state of the environment at the time step (step 202).

Generally, the data characterizing the state of the environment includes sensor data generated from sensor readings of sensors of the agent at the time step. For example, the sensor data can include proprioceptive information sensed by one or more sensors of the agent. As another example, the sensor data can include visual data, e.g., video or an image, sensed by one or more sensors of the agent. Other examples of sensor data are described above.

In some cases, observation also includes other data.

For example, the other data can include task data characterizing the task being performed by the agent.

The task data can include, e.g., one or more of, data characterizing a target state of the agent for completing the task, data characterizing one or more objects in the environment that the agent needs to interact with to complete the task, e.g., a target position of the one or more objects, a current position of the one or more objects, or an image of the one or more objects, or data characterizing one or more target locations in the environment to be reached for completing the task. The task data can be represented in any of a variety of formats, e.g., as images, as natural language text, as geographical coordinates, as a combination of data types, or as embeddings of one or more of the above.

The system processes the observation using a task policy neural network for the task to generate a task output that defines a latent action vector from a latent action space (step 204).

In particular, the task output can define a probability distribution over the latent action space and the system can generate the latent action vector by sampling a latent action from the latent action space.

The action space is referred to as a "latent" action space because the latent vectors in the space represent learned quantities rather than control inputs for the agent. That is, the latent action vectors provide a learned signal to the low-level controller neural network to guide the low-level controller neural network in selecting a control input.

More specifically, the system can determine, from the task output, parameters of the probability distribution.

For example, the distribution can be a multi-variate Gaussian distribution over the latent action space and the task output can include (i) a mean of a multi-variate Gaussian distribution over the latent action space and (ii) a covariance matrix of the multi-variate Gaussian distribution over the latent action space.

Optionally, the task output can also include (iii) a filtering value that the system uses to adjust the mean of the multi-variate Gaussian.

When the task output includes the filtering value, as part of generating the parameters of the probability distribution, the system applies the filtering value to the mean in the task output to generate a mean of the probability distribution, e.g., to generate the mean of the multi-variate Gaussian distribution.

In some implementations, the system applies the filtering value to the mean in the task output by computing a product between the filtering value and the mean.

In some other implementations, the system applies the filtering value to the mean in the task output by clipping the mean included in the task output based on a range of latent actions provided as input to the low-level controller neural network during the pre-training of the low-level controller neural network and then computing a product between the filtering value and the clipped mean to generate an adjusted mean. After applying the filtering value to the mean to generate the adjusted mean, the system can generate the final mean by computing a sum of the adjusted mean and a product of the latent action vector that was selected at the preceding time step and (1—the filtering value).

Thus, the filtering value determines how much weight is assigned to the preceding latent action vector when computing the mean of the current probability distribution.

Optionally, the input to the task policy neural network can include additional information, e.g., the latent action vector that was selected at the preceding time step.

The task policy neural network can generally have any appropriate architecture that allows the task policy neural network to map an observation to an output that defines a latent action vector.

One example architecture of the task policy neural network is described below with reference to FIG. 4.

The system processes a low-level input that includes (i) the sensor data and (ii) the latent action vector defined by the task output using a low-level controller neural network to generate a policy output (step 206). That is, when the observation includes both the sensor data and task data, the low-level controller neural network receives the sensor data as input but does not receive the task data. Because the low-level controller does not receive any task specific data and because of the way that the low-level controller is trained, the same low-level controller can be reused for multiple different downstream tasks.

As described above, the policy output defines a control input for controlling the agent in response to the observation.

The low-level controller neural network is a neural network that is configured to process the low-level input to generate the policy output.

Generally, the low-level controller neural network can have any appropriate architecture that allows the neural network to map the low-level input to the policy output.

In some implementations, the low-level controller neural network has a two-branch architecture, i.e., includes two "branches" of neural network layers.

In these implementations, the low-level controller neural network is configured to process the sensor data through a first neural network branch that includes a plurality of first neural network layers to generate a first branch output and process a second branch input that includes the first branch output and the latent action vector defined by the task output through a second neural network branch that includes a plurality of second neural network layers to generate a second branch output. Optionally, the second branch of the neural network can also receive, in addition to the first branch output, a further input that is derived from the sensor data, e.g. the sensor data itself or the output of an adaptive or non-adaptive processing unit which receives the sensor data.

Thus, only the second branch receives the latent action vector.

The low-level controller neural network then generates the policy output from the first branch output and the second branch output.

For example, the low-level controller neural network can compute a linear combination of the first branch output and the second branch output and then generate the policy output from the linear combination.

An example of the architecture of the low-level controller neural network is described below with reference to FIG. 4.

The system controls the agent using the control input defined by the policy output (step 208), e.g., as described above.

That is, the system causes the agent to perform the control input, e.g., by directly submitting the control input to the agent or by transmitting instructions or other data to a control system for the agent that will cause the agent to perform the control input.

Figure 3:
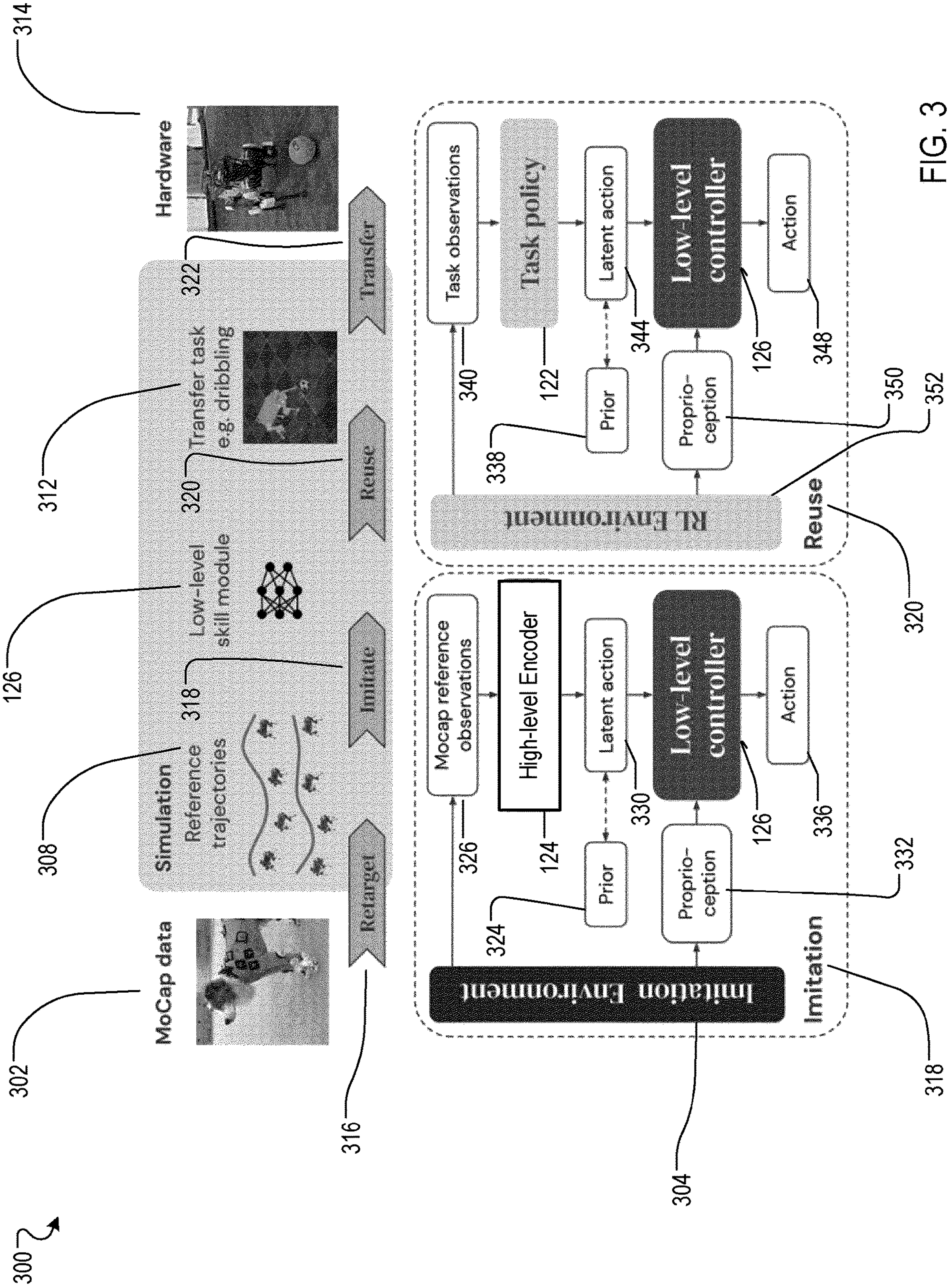
FIG. 3 shows an example training framework.

FIG. 3 shows an example overview of a training framework 300 for training the high-level policy neural network and the low-level controller neural network.

As shown in FIG. 3, the training proceeds across four phases: a retarget phase 316, an imitate phase 318, a reuse phase 320, and a transfer phase 322.

In the example of FIG. 3, the agent that is controlled by the high-level policy neural network and the low-level controller neural network after training is a quadruped robot 314 that can be controlled to perform tasks in a real-world environment. More generally, however, the training framework can be used to train neural networks to control any of a variety of agents.

In the retarget phase 316, the system generates a set of reference trajectories 308 in a computer simulation of the real-world environment from an offline data set 302 of agent motion in the real-world environment.

That is, the system maps ("refactors") a data set of agent motion data that characterizes motion of an expert agent in a real-world environment to a set of reference trajectories that represent a simulated version of the agent moving through the computer simulation of the real-world environment.

For example, in the example of FIG. 3, the system uses motion capture (MoCap) data of motion by a dog (a quadruped animal) to generate reference trajectories 308 that reflect motion of a simulated quadruped robot in a computer simulation.

An example of how motion by an animal can be refactored to generate a set of reference trajectories now follows.

For example, the system can first obtain a data set of animal, e.g., dog, motion. In particular, the system can map the animal motion to simulated agent motion by using a procedure involving inverse-kinematics, e.g., where the system alternates optimizing joint positions per frame and marker positions over all frames. In some cases, the simulated agent can be proportionally wider than the reference animal, the robot's legs tend to fold inwards when using the inverse-kinematics, leading to less stable poses. This is resolved by adding a small regularization penalty towards a stable standing pose for the simulated agent, which causes the markers on the feet to move inwards with respect to the feet themselves. Furthermore, the system enforces left right and front-back symmetry of the markers, which allows the system to mirror the reference motions as a form of data augmentation and allows e.g. simulated agent to walk backwards. The system can also filter out parts of reference trajectories that have e.g. joint positions or velocities which exceed the specifications, or where the animal is sitting or laying down or otherwise not significantly moving. The system can further chunk the clips into segments of a length of maximum 10 seconds. Finally, the system can interpolate the reference trajectories using cubic and SQUAD interpolation. This allows the system to train controllers at control rates that are different from the original reference trajectories.

An example of refactoring a set of human motion now follows.

For example, the system obtain a data set of human motion, e.g., a data set of walking and running trajectories that has already been retargeted to a humanoid model. However, if the simulated agent has no degrees of freedom in the torso, the system can combine all upper body movements into the hip joints. Specifically, the system treat the entire upper body as a single rigid body and rotate the simulated agent model so that its torso orientation agrees with the uppermost spine frame of the humanoid, and uses the three hip joints to match the orientation of the upper leg relative to the torso. The system can also scale translations along each trajectory by the ratio between leg lengths of the two walker models, e.g., to assist with trajectories where there are regular contacts between a foot and the ground.

While FIG. 3 shows the system generating this data, in other examples, the system receives the reference trajectories as input, e.g., after the reference trajectories are generated by another system.

During the imitate phase 318, the system trains the high-level encoder neural network and the low-level controller neural network on the reference trajectories, e.g., to imitate the reference trajectories. As a result, the system learns a low-level controller neural network 126 that serves as a low-level skill module that can cause the agent to carry out a variety of low-level skills based on latent action inputs. In particular, by training the high-level encoder neural network and the low-level controller neural network 126 jointly, the low-level controller neural network 126 learns to cause the agent to carry out low-level, primitive movements that are demonstrated in the reference trajectories guided by high-level latent action vectors.

During the reuse phase 320, the system trains the task policy neural network (while holding the low-level controller fixed) in the computer simulation of the environment through reinforcement learning on a transfer task 312. That is, the system controls simulations of the agent interacting with the computer simulation and trains the neural network on rewards for the transfer task 312 received as a result of the interactions.

After the reuse phase 318 and in the transfer phase 322, the system transfers the learned policy. That is, the system uses the trained task policy neural network and the low-level controller to control the agent 314 in the real-world environment. In some cases, the system can effectively perform this transfer without requiring any training to be performed in the real-world.

In more detail, in the imitation phase 318, the simulated agent interacts with an imitation environment 304 that is generated by the computer simulation and that is a simulation of the real-world environment.

In other words, the system uses the reference trajectories that are generated as a result of another agent interacting with the environment to train the high-level encoder neural network and the low-level controller neural network. As part of this training, the system controls the simulated agent to attempt to imitate states encountered in the reference trajectories and trains the neural networks to improve the quality of the imitation.

Generally, the high-level encoder neural network 124 is configured to receive context information characterizing a state of an environment and to generate an encoder output that defines a probability distribution over the latent action space. The context information may be sensor data obtained from measuring a real-world environment using sensors (e.g. a camera), or it may be derived from sensor data, e.g. by refactoring the sensor data to describe a simulated environment resembling the real-world environment.

Because the high-level encoder neural network 124 is being used only to cause the controller 126 to learn low-level skills, the context information characterizing the state of the environment can include information characterizing future states in the corresponding reference trajectory.

That is, the context information being provided to the encoder 124 describes the reference trajectory to imitate and, in particular, describes future states of the reference trajectory. As a particular example, the context information can include data that describes the body positions and orientations of the agent at subsequent future time steps, encoded relative to the current pose of the agent.

Thus, during the imitation phase, the system controls the agent by receiving context information 326 derived from a corresponding reference trajectory and processing the context information 326 using the high-level encoder neural network 124 to generate a latent action 330. The system then processes the latent action 330 and sensor data, e.g., proprioceptive information 332, using the low-level controller 126 to select an action 336.

Optionally, during the imitation phase, the high-level encoder neural network 124 can be regularized using a prior distribution 324, as will be described in more detail below.

Training the high-level encoder and the low-level controller during the imitation phase will be described in more detail below.

During the reuse phase 318, the simulated agent interacts with a reinforcement learning (RL) environment 352 that is generated by the computer simulation and that is a simulation of the real-world environment.

Optionally, during the reuse phase 318, the imitation phase 316, or both, the system can employ domain randomization when simulating the real-world environment. In domain randomization, the system can randomly vary certain properties of the environment, of objects in the environment, or of the simulated agent when generating any given environment state or at the outset of any given episode of imitation or any given task episode. Examples of properties that can be varied include kinematic and dynamic properties of the model of the real-world environment, friction or other properties of interactions between objects; body masses and center-of-mass locations; and joint positions, offsets, damping and friction losses; perturbations to simulated agents, e.g., in the form of random forces applied to the torso; and noise and/or delays to the simulated sensor readings.

In particular, the simulated agent can be controlled in the RL environment 352 to perform actions in order to attempt to perform task episodes of the task in the simulated environment.

To control the agent at a given time step during a task episode, the system receives a task observation 340 that includes proprioceptive information 350 and task information.

The system then processes the task observation 340 using the task policy neural network 122 generate a task output that defines a latent action vector 344 from the latent action space.

The system processes the proprioceptive information 350 and the latent action vector 344 using the low-level controller 126 to select a control input ("action") 348.

The system can then receive a reward and train the task policy neural network 122 and, optionally, the value neural network 128 based on the selected control input 348 and the received action.

As described above, during the RL training, the value neural network 128 can receive privileged information. For example, because the reuse phase 320 is performed in simulation, the value neural network 128 can receive a value input includes additional information characterizing an input state of the computer simulation of the real-world environment that is not provided to the task policy neural network or the low-level controller neural network.

For example, the value input can include data characterizing one or more future states of the computer simulation of the environment or ground truth state data obtained from the computer simulation of the environment (e.g. data which provides more information about the simulated environment than the sensor data would about the real-world environment, such as data describing exactly the three-dimensional shapes and/or three-dimensional positions of objects in the environment, rather than just image data defining an image captured from a certain location or proprioceptive information captured by proprioceptive sensors of the agent) or both.

Thus, the same low-level controller 126 is "reused" from the imitation phase 314 to perform the reuse phase 318 and then is deployed to control the agent after training.

Figure 4:
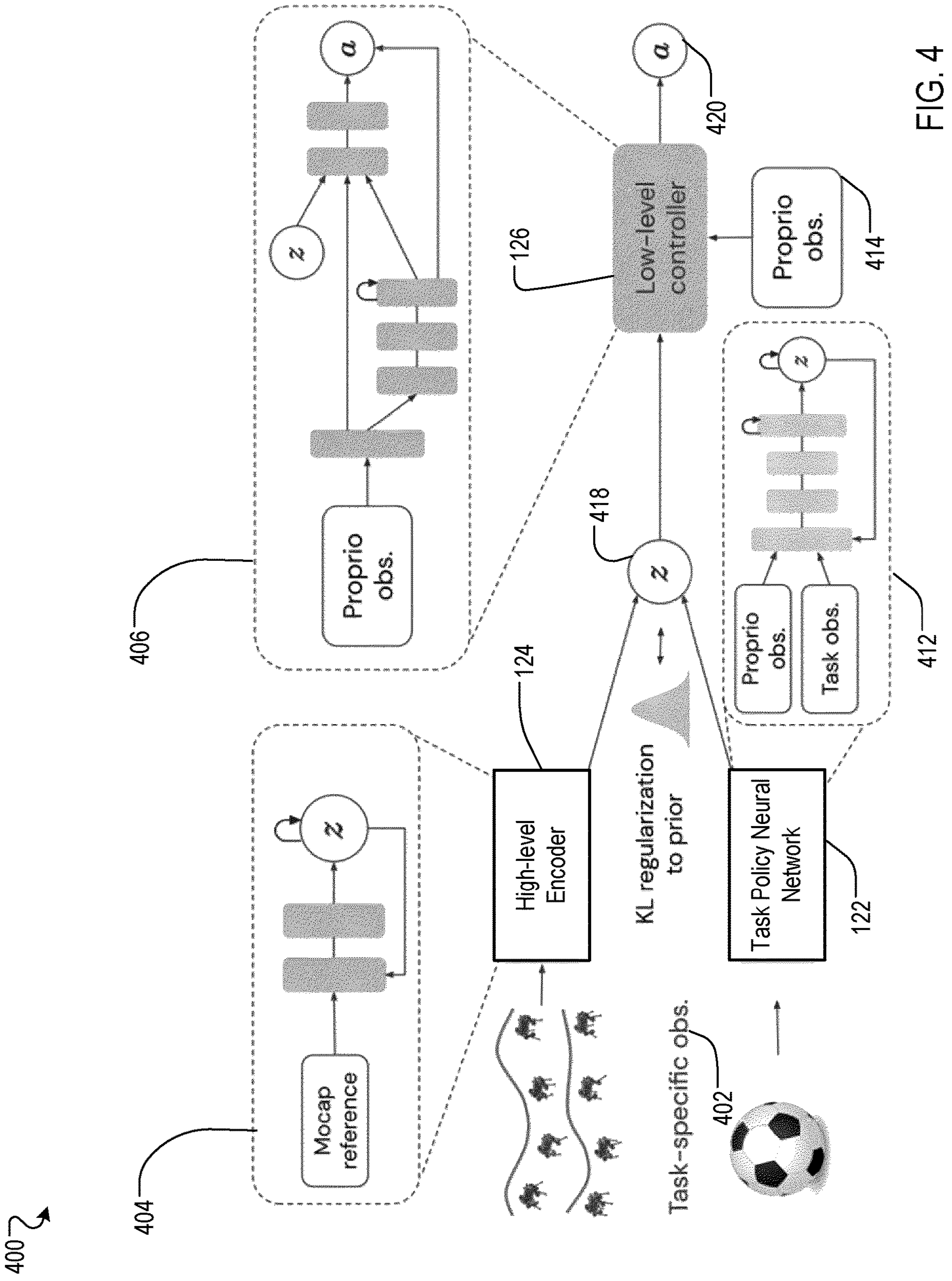
FIG. 4 shows example architectures of the neural networks used by the action selection system.

FIG. 4 shows example architectures of the neural networks used during the imitation and reuse phases.

In particular, as shown in FIG. 4, the system can process context information from reference trajectories using the high-level encoder neural network 124.

The high-level encoder neural network 124 is configured to receive context information characterizing a state of an environment and to generate an encoder output that defines a probability distribution over the latent action space.

The system can then sample a latent action vector 418 from the latent space using the encoder output.

The system can then process the latent action vector 418 using the low-level controller neural network 126 to select an action 420.

The system can also process task-specific observations 402 that include task data and sensor data using the task policy neural network 122 to generate a task output that defines a probability distribution over the latent action space.

The system can then sample a latent action vector 418 (denoted "z" in FIG. 4) from the latent space using the task output and then process the latent action vector 418 using the same low-level controller neural network 126 to select an action 420, e.g., as part of attempting to perform an episode of the task during reinforcement learning training or after deployment.

FIG. 4 shows an example architecture 404 of the high-level encoder neural network 124.

Generally, the architecture of the encoder 124 is dependent on the type of information included in the context information. For example, in the example of FIG. 4, the high-level input includes low-dimensional data, e.g., future state data like proprioceptive information or electrical conditions and the encoder 124 is therefore a multi-layer perceptron (MLP). When the high-level input also includes higher-dimensional data, e.g., images, the encoder 310 can include an MLP to encode the low-dimensional data and a convolutional neural network, a self-attention neural network or a neural network that includes both convolutional and self-attention layers to encode the higher-dimensional data.

Optionally, the encoder 124 can have a recurrent neural network layer to process the encoded representation of the context information to generate the encoder output.

FIG. 4 also shows an example architecture 406 of the low-level controller 126. As described above, in some implementations, the low-level controller 126 has a two-branch architecture.

In particular, as shown in the example of FIG. 4, the neural network 126 is configured to process the sensor data (a proprioceptive observation, in the example of FIG. 4) through a first neural network branch that includes a plurality of first neural network layers to generate a first branch output.

As shown in FIG. 4, the first component of the first branch is a normalization layer, e.g., a layer normalization layer, that applies a normalization to the sensor data generate normalized sensor data and the controller 126 then processes the normalized sensor data through the layers in the first branch (shown in FIG. 4 as the three lower rectangular blocks in the architecture 406) to generate the first branch output.

The neural network 126 also processes a second branch input that includes the first branch output and the latent action vector z defined by the task output or the encoder output through a second neural network branch that includes a plurality of second neural network layers to generate a second branch output. As can be seen from FIG. 4, the first branch does not receive the latent action vector.

Moreover, in the example of FIG. 4, the second branch input also includes the normalized sensor data.

The neural network 126 then generates the policy output that defines the control input 420 from the first branch output and the second branch output. For example, the neural network 126 can compute a linear combination of the first and second branch outputs. In some cases, the linear combination can be the final policy output while in other cases, the system applies one or more additional transformations to the linear combination, e.g., by processing the linear combination through one or more additional neural network layers, to generate the final policy output.

As shown in FIG. 4, the first neural network branch includes one or more recurrent neural network layers while the second neural network branch includes only feedforward neural network layers, i.e., does not include any recurrent layers.

For example, the first branch can include one or more fully-connected layers followed by the one or more recurrent neural network layers while the second branch can include only a sequence of fully-connected layers.

The one more recurrent neural network layers can include one or more long short-term memory (LSTM) layers, one or more gated recurrent unit (GRU) layers, and so on.

Thus, the recurrent neural network layer(s) in the first branch are not conditioned on the latent action vector and the controller neural network 126 only processes the latent action vector using feedforward neural network layers.

In particular, as the low-level controller will be reused and deployed on hardware, the low-level controller only observes the latent action vector and the noisy, raw sensor readings. For example, in the case of proprioceptive information of a robot, these can include any of the joint positions and position setpoints, angular velocity, linear acceleration and roll & pitch estimates from an IMU sensor, and so on.

Given just instantaneous observations, however, the environment state would be partially observed by the controller 126

To overcome this limitation, the architecture of the controller 126 allows the controller neural network 126 to effectively select control inputs based only on the environment state by enabling the low-level controller to infer more of the state by adding memory in the form of the one or more recurrent layers. This has the additional benefit that the controller 122 can learn to identify and implicitly adapt to the different dynamics variations in the simulations and, therefore, after deployment.

However, providing memory to the low-level controller 126 could cause it to overfit to the latent command sequences seen during imitation, thus becoming overly or insufficiently sensitive to the latent commands during reuse. To mitigate this, the architecture is split into the two branches described above, so that the recurrent layers are not given access to the latent action vectors.

FIG. 4 also shows an example architecture 412 of the task policy neural network 122. The task policy neural network 122 receives the sensor data and the task data (referred to as "task obs." in FIG. 4).

As with the high-level encoder, the architecture of the task policy neural network 122 is dependent on the type of information included in the observation. For example, in the example of FIG. 4, the sensor data includes low-dimensional data, e.g., proprioceptive information, and the task data is also represented as low-dimensional data, e.g., coordinates of target objects in the environment, dimensions of the target objects, and so on, and the task policy neural network 122 include an MLP to encode the low-dimensional data, e.g., the concatenation of the sensor data, the task data, and the preceding latent action vector. When the high-level input also includes higher-dimensional data, e.g., images, the task policy neural network 122 can include an MLP to encode the low-dimensional data and a convolutional neural network, a self-attention neural network or a neural network that includes both convolutional and self-attention layers to encode the higher-dimensional data.

Optionally, the task policy neural network 122 can have a recurrent neural network layer to process the encoded representation of the observation to generate the task output.

Figure 5:
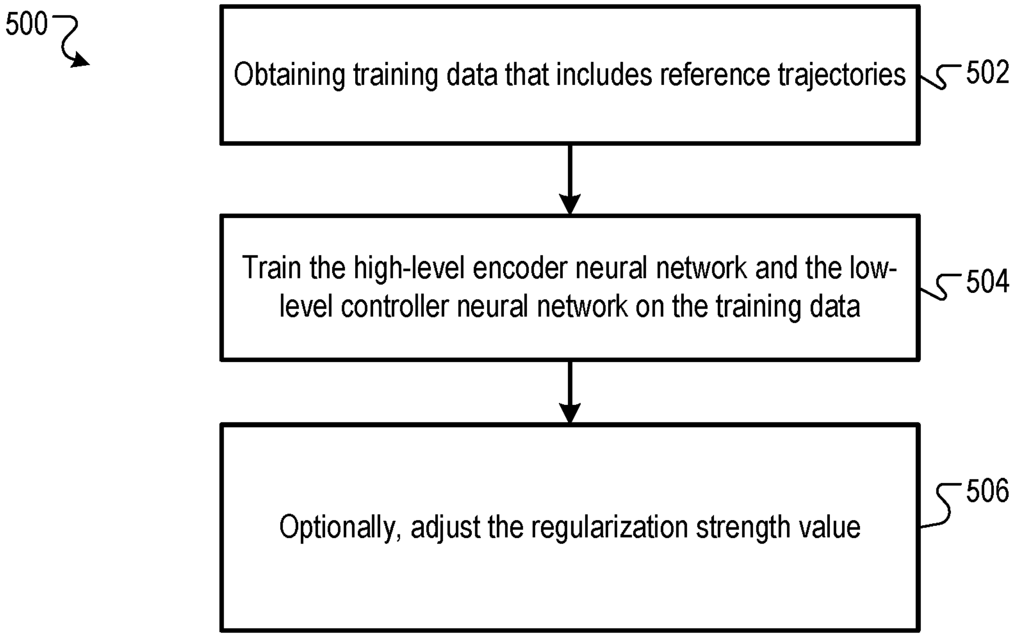
FIG. 5 is a flow diagram of an example process for performing the imitation phase.

FIG. 5 is a flow diagram of an example process 500 for performing the imitation phase. For convenience, the process 500 will be described as being performed by a system of one or more computers located in one or more locations. For example, a training system, e.g., the training system 100 of FIG. 1, appropriately programmed, can perform the process 500.

The system obtains training data that includes a plurality of reference trajectories (step 502). Each reference trajectory is generated as a result of a corresponding expert agent interacting with the environment. For example, as described above, each reference trajectory can be generated by refactoring a motion trajectory of a corresponding agent in the real-world into a trajectory of an agent in a computer simulation.

The system trains the high-level encoder neural network and the low-level controller neural network on the training data to optimize an objective function (step 504).

The objective function generally includes one or more imitation learning terms that measure how well the agent imitates each corresponding expert agent. That is, the one or more imitation learning terms measure, for each reference trajectory, how well the agent imitates the corresponding expert agent in the trajectory.

For example, the one or more imitation learning terms can include one or more reward terms that each measure a corresponding aspect of how well the agent imitates each corresponding agent. In this example, the system can training the high-level encoder neural network and the low-level controller neural network on the training data by training the high-level encoder neural network and the low-level controller neural network on the training data through reinforcement learning, e.g., to maximize a total reward that is generated by summing the one or more reward terms.

That is, during the imitation phase, the system can repeatedly perform the following operations.

The system can sample a random reference trajectory from the reference trajectories. In some cases, the sampling can be subject to one or more constraints. For example, the system can sample the reference trajectories so that there is an approximately uniform distribution over velocities, to prevent overfitting to either extreme of the velocity range.

After sampling the random trajectory, the system samples an initial state from the states in the reference trajectory.

The system then controls the agent starting from the initial state using the high-level encoder and the low-level controller. At every time step, the system computes the one or more reward terms that compare the current state with the corresponding state in the reference trajectory. That is, each reward term measures a different aspect of similarity between the current state and the corresponding state.

The system can determine to terminate the episode either when all states in the reference trajectory have been exhausted or when the state deviates too much from the reference state, e.g., by comparing the agent's pose with the corresponding agent's pose in the corresponding state.

In some implementations, the objective functions can also include one or more additional reward terms that do not depend on the reference trajectory. For example, the additional reward terms can include an additional reward term that minimizes the current draw of the actuators of the agent, which can be helpful to further suppress higher-frequency excitations.

In some implementations, the system also employs a value neural network during the imitation phase and uses an actor-critic reinforcement learning technique for the imitation phase. Like during the reuse phase, the value neural network can be provided with privileged information in the imitation phase. For example, the value neural network can be provided with additional information characterizing the reference trajectory.

For example, the reinforcement learning technique can be MO-VMPO and the system can treat the reward terms as separate objectives. Alternatively, the reinforcement learning technique can be MPO and the system can optimize a sum of the reward terms.

In some implementations, the objective function also includes a regularization term that penalizes the high-level encoder neural network for generating outputs that specify probability distributions that diverge from a prior distribution over the latent action space. In these implementations, the regularization term is weighted in the objective function with a regularization strength value. As a particular example, the regularization term can be a KL divergence between the probability distribution specified by the high-level encoder at a given time step and the prior distribution at the given time step.

For example, the probability distribution can be an autoregressive distribution over the latent action space, e.g., so that the distribution at a given time step is dependent on the latent action vector that was selected at the preceding time step.

For example, the probability distribution can be an order 1 autoregressive (AR1) distribution over the latent action space. The AR1 distribution can be expressed as:

$$p(z_t \mid z_{t-1}) = \mathcal{N}(\alpha \cdot z_{t-1}, (1-\alpha^2) \cdot I),$$

where $\mathcal{N}$ represents the Normal distribution, α is a fixed scaling factor, $z_t$ is a latent action vector at time step t, $z_{t-1}$ is the latent action vector that was selected at the preceding time step t−1, and I is an identity matrix.

Thus, this regularization term and the corresponding prior encourages the latent commands to change more slowly over time.

For example the objective function can be a sum of the imitation learning terms and a product of the regularization strength value and the regularization term.

Optionally, during the training, the system can repeatedly increase the regularization strength value according to a schedule (step 506).

That is, the system can implement a schedule on the regularization strength value that increases the regularization strength value according to the schedule.

For example, the schedule can be an increasing function of a number of environment steps processed, e.g., a linear function or an exponential function, the system can increase the regularization strength value according to the schedule by, at each training step, setting the regularization strength value equal to an output of the schedule for the number of environment steps processed during the training as of the training step.

Optionally, the schedule maps each number of environment steps after a threshold number to a constant maximum value, e.g., 0.3.

In particular, the regularization strength can be important for preserving the style and smoothness of locomotion in the reuse phase. Little to no regularization generally can lead to poor reuse and the higher the regularization, the closer one gets to the Pareto front of solutions. Additionally, for some task and some agents, there may be a cut-off point after which increasing the strength will prevent successful imitation and subsequent reuse. In this case, information cannot flow from the encoder to the low-level controller before the policy has learned to imitate the reference trajectories.

A schedule on the strength can be effective in maximizing regularization while retaining successful imitation. When using the schedule, learning can occur in two stages: first the policy learns to effectively imitate the reference trajectories, and subsequently the regularization encourages the latent commands to follow the prior and change more slowly over time. For example, by making use of a schedule, the system can use higher regularization at the ends of schedule that would be unable to be employed at the beginning of training, i.e., that would cause learning to fail when employed at the beginning of training.

As described above, after training the high-level encoder and the low-level controller during the imitation phase, the system trains the task policy neural network during the reuse phase through reinforcement learning.

In some implementations, the system also makes use of the regularization term in the objective function during the training for the reuse phase.

That is, the system includes, in the objective for the training of the task policy neural network, a regularization term that penalizes the task policy neural network for generating task outputs that specify probability distributions, e.g., multi-variate Gaussian distributions that diverge from the prior distribution, e.g., the AR(1) prior distribution over the latent action space.

As described above, the AR(1) distribution generally has a scaling factor that defines the correlation of the current probability distribution with the previous time step.

In some implementations, when the outputs of the task policy neural network include the filtering value, the system initializes the task policy neural network to generate filtering values that equal the scaling factor. This ensures that the initial temporal statistics in the early stages of training of the latent vectors match the prior, which can help with exploration during the early stages of reinforcement learning.

Figure 6:
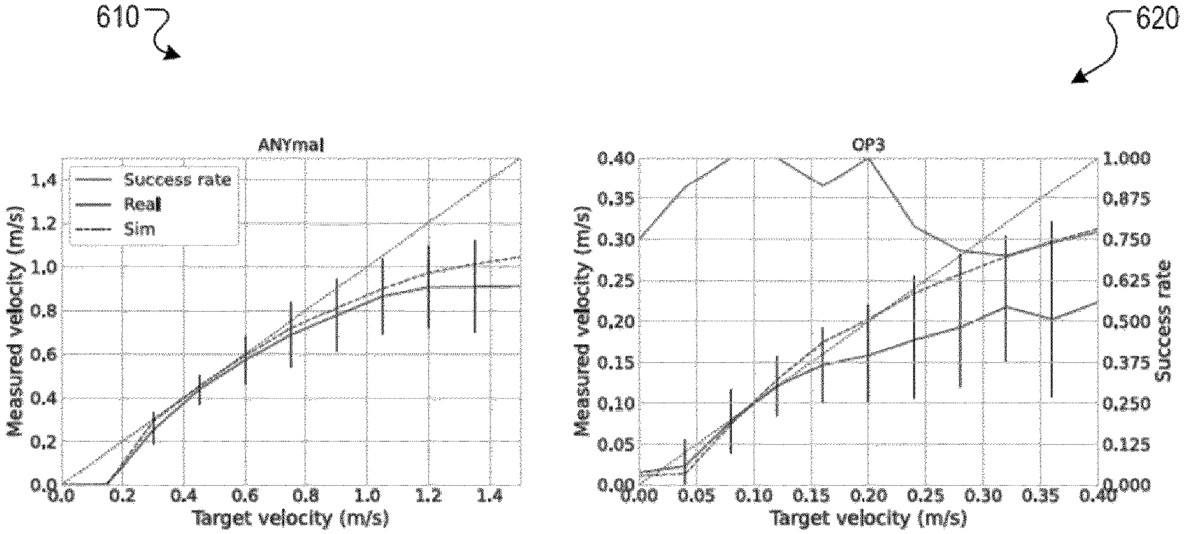
FIG. 6 shows the performance of an agent controlled by the action selection system.

FIG. 6 shows the performance of an agent controlled by the action selection system.

In particular, FIG. 6 shows two charts 610 and 620 that show the performance of two agents controlled by the action selection system. Chart 610 shows the performance of an ANYmal agent, which is a quadruped robot on a task that requires controlling the real-world robot to maintain a target velocity as the robot navigates through the environment. In particular, the chart 610 shows that the action selection system can effectively control both the real-world and simulated robots to approximately match the target velocity even though the controller and the task policy neural network were trained only in simulation.

Chart 620 shows the performance on the same task of an OP3 agent, which is a humanoid robot.

Thus, as can be seen from the charts 610 and 620, the techniques described in this specification allow the system to effectively control a variety of robots in the real-world, even if all of the training performed by the system is done in simulation.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A method for controlling an agent interacting with an environment to perform a task, the method comprising, at each of a plurality of time steps:

receiving an observation comprising data characterizing a state of the environment at the time step, wherein the data characterizing the state of the environment comprises sensor data generated from sensor readings of sensors of the agent at the time step;

processing the observation using a task policy neural network for the task to generate a task output that defines a latent action vector from a latent action space;

processing a low-level input comprising (i) the sensor data and (ii) the latent action vector defined by the task output using a low-level controller neural network to generate a policy output that defines a control input for controlling the agent in response to the observation, wherein the low-level controller neural network is configured to:

process the sensor data through a first neural network branch comprising a plurality of first neural network layers to generate a first branch output;

process a second branch input comprising the first branch output and the latent action vector defined by the task output through a second neural network branch comprising a plurality of second neural network layers to generate a second branch output; and generate the policy output from the first branch output and the second branch output; and controlling the agent using the control input defined by the policy output.

2. The method of claim 1, wherein the agent is a robot and wherein the environment is a real-world environment.

3. The method of claim 2, wherein the task policy neural network has been trained through reinforcement learning to control a simulated agent to perform the task in a computer simulation of the real-world environment.

4. The method of claim 3, wherein the low-level controller neural network is pre-trained prior to training the task policy neural network through reinforcement learning and is held fixed during the training of the task policy neural network through reinforcement learning.

5. The method of claim 3, wherein the task policy neural network has been trained jointly with a value neural network through an actor-critic reinforcement learning technique, and wherein the value neural network is configured to:

receive a value input that includes additional information characterizing an input state of the computer simulation of the real-world environment that is not provided to the task policy neural network or the low-level controller neural network, and process the value input to generate a value output that estimates a value of the input state of the environment to performing the task.

6. The method of claim 5, wherein the additional information comprises one or more of:

(i) data characterizing one or more future states of the computer simulation of the environment, or (ii) ground truth state data obtained from the computer simulation of the environment.

7. The method of claim 1, wherein the first neural network branch comprises one or more recurrent neural network layers and the second neural network branch comprises only feedforward neural network layers.

8. The method of claim 1, wherein processing the sensor data through a first neural network branch comprising a plurality of first neural network layers to generate a first branch output comprises:

applying a normalization to the sensor data to generate normalized sensor data; and processing the normalized sensor data using the first neural network branch to generate the first branch output.

9. The method of claim 8, wherein the second branch input further comprises the normalized sensor data.

10. The method of claim 1, wherein generating the policy output from the first branch output and the second branch output comprises:

computing a linear combination of the first branch output and the second branch output.

11. The method of claim 1, wherein the method further comprises:

generating, from the task output, parameters of a probability distribution over the latent action space; and selecting, as the latent action defined by the task output, a latent action from the latent action space using the probability distribution.

12. The method of claim 11, wherein the task output includes (i) a mean of a multi-variate Gaussian distribution over the latent action space and (ii) a covariance matrix of the multi-variate Gaussian distribution over the latent action space.

13. The method of claim 12, wherein the task output includes (iii) a filtering value, and wherein generating the parameters of the probability distribution comprises:

applying the filtering value to the mean in the task output to generate a mean of the probability distribution.

14. The method of claim 13, wherein applying the filtering value to the mean in the task output to generate a mean of the probability distribution comprises:

computing a product between the filtering value and the mean.

15. The method of claim 13, wherein the low-level controller neural network is pre-trained prior to training the task policy neural network through reinforcement learning and is held fixed during the training of the task policy neural network through reinforcement learning, and wherein applying the filtering value to the mean in the task output to generate a mean of the probability distribution comprises:

clipping the mean included in the task output based on a range of latent actions provided as input to the low-level controller neural network during the pre-training of the low-level controller neural network; and computing a product between the filtering value and the clipped mean.

16. The method of claim 13, wherein:

an objective for the training of the task policy neural network includes a regularization term that penalizes the task policy neural network for generating task outputs that specify multi-variate Gaussian distributions that diverge from an AR(1) prior distribution over the latent action space having a scaling factor.

17. The method of claim 13, wherein:

for the training of the task policy neural network, the task policy neural network is initialized to generate filtering values that equal the scaling factor.

18. The method of claim 1, wherein the observation further comprises task data characterizing the task.

19. The method of claim 18, wherein the task data comprises one or more of:

data characterizing a target state of the agent for completing the task, data characterizing a target position of one or more objects in the environment for completing the task; or data characterizing one or more target locations in the environment to be reached for completing the task.

20. A system comprising:

one or more computers; and one or more storage devices communicatively coupled to the one or more computers, wherein the one or more storage devices store instructions that, when executed by the one or more computers, cause the one or more computers to perform operations for controlling an agent interacting with an environment to perform a task, the operations comprising, at each of a plurality of time steps:

receiving an observation comprising data characterizing a state of the environment at the time step, wherein the data characterizing the state of the environment comprises sensor data generated from sensor readings of sensors of the agent at the time step;

processing the observation using a task policy neural network for the task to generate a task output that defines a latent action vector from a latent action space;

processing a low-level input comprising (i) the sensor data and (ii) the latent action vector defined by the task output using a low-level controller neural network to generate a policy output that defines a control input for controlling the agent in response to the observation, wherein the low-level controller neural network is configured to:

process the sensor data through a first neural network branch comprising a plurality of first neural network layers to generate a first branch output;

process a second branch input comprising the first branch output and the latent action vector defined by the task output through a second neural network branch comprising a plurality of second neural network layers to generate a second branch output; and generate the policy output from the first branch output and the second branch output; and controlling the agent using the control input defined by the policy output.

* * * * *